US008620797B1

(12) United States Patent
Heinsohn et al.

(10) Patent No.: US 8,620,797 B1
(45) Date of Patent: Dec. 31, 2013

(54) SYSTEMS AND METHODS FOR STREAMLINED PURCHASING

(75) Inventors: Susan E. Heinsohn, San Antonio, TX (US); Elsa E. Ramirez, Pearsall, TX (US); Matthew Charles Hernandez, San Antonio, TX (US); Sean Graham, Charlotte, NC (US)

(73) Assignee: United Services Automobile Association, San Antonio, TX (US)

( * ) Notice: Subject to any disclaimer, the term of this patent is extended or adjusted under 35 U.S.C. 154(b) by 900 days.

(21) Appl. No.: 11/871,652

(22) Filed: Oct. 12, 2007

Related U.S. Application Data

(60) Provisional application No. 60/914,983, filed on Apr. 30, 2007.

(51) Int. Cl.
*G06Q 40/00* (2012.01)
(52) U.S. Cl.
USPC .......................................................... 705/38
(58) Field of Classification Search
USPC ................................................... 705/35–45
See application file for complete search history.

(56) References Cited

U.S. PATENT DOCUMENTS

| | | | |
|---|---|---|---|
| 5,870,721 A * | 2/1999 | Norris | 705/38 |
| 6,088,686 A * | 7/2000 | Walker et al. | 705/38 |
| 7,107,241 B1 * | 9/2006 | Pinto | 705/38 |
| 2002/0040339 A1 * | 4/2002 | Dhar et al. | 705/38 |
| 2003/0036995 A1 * | 2/2003 | Lazerson | 705/38 |
| 2005/0044039 A1 * | 2/2005 | Greer et al. | 705/39 |
| 2007/0170250 A1 * | 7/2007 | Bystrom et al. | 235/382 |

OTHER PUBLICATIONS

"America First Credit Union Gives Over 300,000 Members Access to Nation's First Speech-Enabled Instant Loan Application Powered by SpeechWorks"; LookSmart; Oct. 8, 2002; pp. 1-3; http://findarticles.com/p/articles/mi_m0EIN/is_2002_Oct_8/ai_92579632.
"Capital One Blank Check Auto Loan"; Capital One auto finance; as viewed on Sep. 25, 2007; pp. 1-2; http://www.capitalone.com/autoloans/blank-check/index.php?linkid=WWW_Z_Z_Z_BCHW_H2_01_T_ALBC.
"Capital One Blank Check Auto Loan: FAQ"; Capital One auto finance; as viewed on Sep. 25, 2007; pp. 1-3; http://www.capitalone.com/autoloans/blank-check/faq.php?linkid=WWW_Z_Z_Z_ALBC_H2_03_T_BCFAQ.
"HSBC Auto Finance TurboCheck FAQs"; HSBC; as viewed on Sep. 25, 2007; pp. 1-2; http://www.hsbcusa-autoloans.com/auto_loans/turbocheck_faqs.html.
"Loan"; Wikipedia, the free encyclopedia; as viewed on Sep. 25, 2007; http://en.wikipedia.org/wiki/Loan.
"U.S. Appl. No. 11/871,661, Final Office Action mailed May 11, 2009", 14 pgs.
"U.S. Appl. No. 11/871,661, Non Final Office Action mailed Aug. 20, 2008", 9 pgs.

(Continued)

*Primary Examiner* — Clifford Madamba
(74) *Attorney, Agent, or Firm* — Schwegman Lundberg & Woessner P.A.

(57) ABSTRACT

Systems and methods for streamlined purchasing are described herein. The method may include receiving application to finance an item, approving the application and providing a financial document to the customer which requires no further interaction between the customer and the lending institution. The method may alternately include receiving a pre-approved financial instrument from a merchant, and processing the instrument, where the instrument was presented to the merchant by a customer and executed at the time of purchase without further interaction between the customer and the lending institution.

18 Claims, 3 Drawing Sheets

(56) References Cited

OTHER PUBLICATIONS

"U.S. Appl. No. 11/871,661, Non Final Office Action mailed Sep. 3, 2009", 10 pgs.

"U.S. Appl. No. 11/871,661, Response filed Jan. 20, 2009 to Non Final Office Action mailed Aug. 20, 2008", 14 pgs.

"U.S. Appl. No. 11/871,661, Response filed Aug. 11, 2009 to Final Office Action mailed May 11, 2009", 12 pgs.

\* cited by examiner

SYSTEMS AND METHODS FOR STREAMLINED PURCHASING

RELATED APPLICATIONS

The present application claims the benefit of and incorporates by reference Provisional Application No. 60/914,983 filed 30 Apr. 2007. Additionally, this disclosure is related to pending U.S. patent application Ser. No. 11/871,661, titled "SYSTEMS AND METHODS FOR STREAMLINED PURCHASING," filed on an even date herewith.

TECHNICAL FIELD

This application relates to systems and methods that provide purchasing and more particularly to systems and methods that provide streamlined purchasing for a customer.

BACKGROUND

Customers demand more of the products and services they use than ever before. They insist that the companies they deal with on a regular basis provide them greater and greater levels of information and service. When engaging in complicated financial transactions, customers are increasingly intolerant of those intricate processes. Those customers seek out companies that provide more and more streamlined processes without regard to the intricate nature of them.

SUMMARY

In an embodiment, a method of providing a financed payment to a customer includes receiving an application to finance an item, approving the application, and providing to the customer a financial document which when executed constitutes the customer's acceptance of the terms of the loan. The document provides an immediately negotiable financial instrument to the merchant of the item which may be executed by the customer without further interaction between the customer and the lending institution.

In an embodiment, a method of honoring a pre-approved financial device includes receiving a pre-approved financial instrument from a merchant and processing the pre-approved financial instrument. The pre-approved financial instrument was executed by a lendee at the point of purchase, without interaction between the lendee and the lending institution at the time of the purchase of the item. The pre-approved financial instrument is an immediately negotiable financial instrument.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Figure 1:
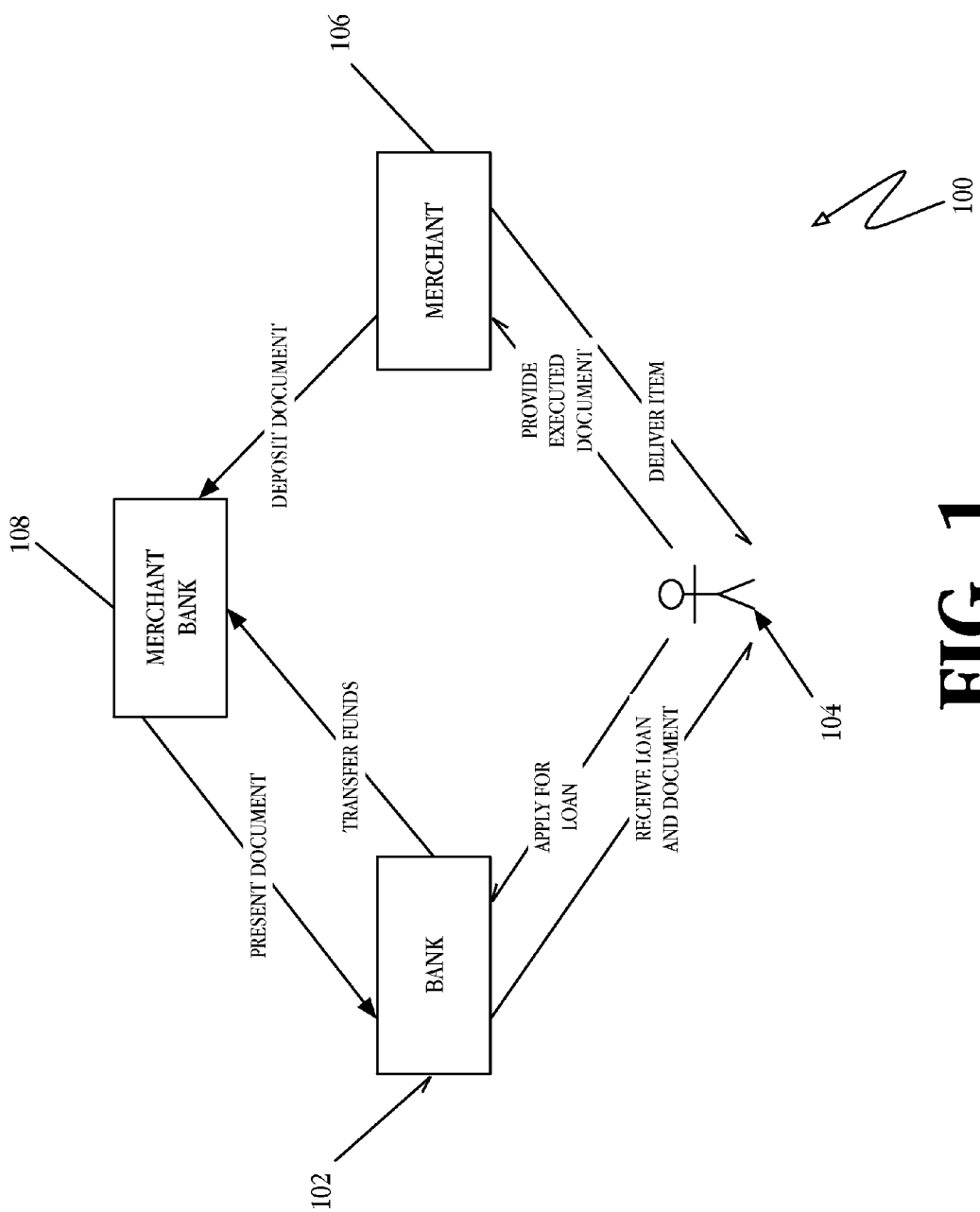
FIG. 1 shows a high-level block diagram of a system providing streamlined purchases to customers, in accordance with an example embodiment.

FIG. 1 shows a high-level block diagram of a system providing streamlined purchases to customers, in accordance with an example embodiment. The system 100 includes a lending institution or bank 102, a customer 104, a merchant 106 and a merchant's bank 108. The merchant 108 sells one or more items which may require financing. Some examples of these include a house, an automobile, recreational vehicle, business, and the like. There are many choices for financing for these types of purchases, and even more options for the terms associated with those financing. The systems and methods described herein have equal applicability to any transaction where the customer 104 requires financing for the purchase of the item. An auto purchase will be used as an example, though the systems and methods are not limited in any manner.

The customer begins the auto purchase procedure by applying for and receiving an auto loan. The bank determines the terms of the loan based on the credit-worthiness of the customer, and in some cases may deny the loan to the customer. In order to facilitate the quick purchase of the vehicle, the bank delivers a blank check, or financial document, to the customer, which can be presented to the merchant. The blank check, also known as a pre-approved financial instrument, includes legal terms printed on the check. These legal terms constitute a legally binding contract when executed by the customer at the time of purchase. The customer executes the check by signing it at the time of purchase. The pre-approved financial instrument also includes a maximum loan amount, and in some cases, a minimum loan amount. The merchant fills in details of the vehicle when the vehicle is purchased. In some systems the details of the vehicle must be provided to the bank prior to the settling of the check, which is handled between the merchant's bank and the bank. These details are required by the bank to secure the loan. In the absence of the details, the loan is essentially unsecured. An unsecured loan has different terms than a secured loan (an auto loan is an example of a secured loan), one of which is a much higher interest rate.

The pre-approved financial instrument, filled out at the time of purchase and executed by the customer, is deposited by the merchant like any other check presented by a customer. The customer receives the car from the merchant and drives off the lot. Their involvement in the payment process is essentially complete. They may receive confirmatory paperwork after the check is finally settled, but their positive involvement in the process is no longer needed.

The pre-approved financial instrument provides a single step operation for the customer. With the inclusion of all of the appropriate language on the check, the customer need not contact the lending institution during the purchase step. This is in contrast to some systems where the customer must call in to obtain an authorization during the purchase of the vehicle. During weekends, as well as later in the weekdays, this represents a large burden on the bank to staff a call center. The pre-approved financial instrument is intended to be complete, when all details are provided, for the purpose of purchasing a financed item.

The pre-approved financial instrument may take other forms, depending on the needs of the bank, and may not be an actual blank check, in some examples. In some examples, the pre-approved financial instrument may be sent from the bank to the merchant. This provides a measure of control over the purchase process, ensuring that the item purchased (also known as collateral for a secured loan) is appropriate and properly valued. However, with some customers, the possibility of fraud can be lessened. The risk then remains that the customer is being overcharged by the seller for a particular item. In the aggregate of many customers over many purchases, a single exceptional loan-to-value (LTV) can be absorbed over many loans. In some examples, the risk of a high LTV can be removed by issuing a second un-secured loan to the customer for the amount that the loan exceeds the value of the purchased item. This may be advantageous in situations where the customer wishes to purchase a vehicle that is over-valued with respect to a book value, but they still desire the vehicle. This may be the case with collector, or classic, vehicles.

Figure 2:
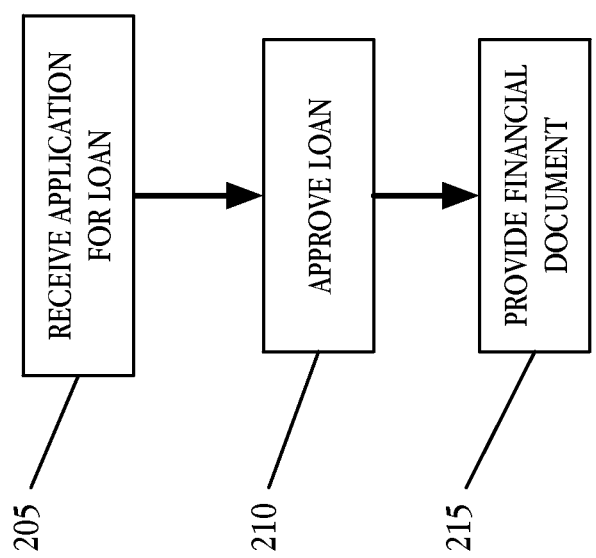
FIG. 2 shows a flowchart of a method for providing a providing a financed payment, in accordance with an example embodiment.

FIG. 2 shows a flowchart of a method for providing a providing a financed payment, in accordance with an example embodiment. The operations shown in FIG. 2 and described here may be carried out within the system shown above in FIG. 1.

At block 205, the bank receives an application from a customer to finance a loan for the purchase of an item, in an example. The bank in this example is the institution lending funds to the customer. The item may include any financed item, such as a car, house, boat, and the like. The customer may be apprised of one or more terms associated with the loan, such as the interest rate, loan period, monthly payments, and the like. Using information contained within the application, the bank either approves or disapproves the loan. The information used may include the age, salary or compensation, and identifying information about the customer. The identifying information can be used by the bank to determine the credit-worthiness of the customer, such as by requesting and receiving a credit report for the customer, the customer's spouse or partner, or any combination thereof.

At block 210, the application for the loan is approved using the information. At block 215, a financial document is provided to the customer. Providing may include sending, through a courier, the financial document to the customer. The courier may include any suitable courier method, such as United States Postal Service, United Parcel Service, Federal Express, DHL or the like. It may be advantageous to choose a courier method that allows tracking of the delivery. Providing may also include sending, through suitable electronic means, an electronic file which can be printed by the customer. The file when printed provides the financial document to the customer. This latter method provides a courier-less delivery method to the bank, however, provision of one or more fraud-prevention methods may be applied to the electronic file to reduce fraudulent use of the file. This may include embedding a digital watermark in the electronic file which ensures that the document is only printed once. It may also include additional software code embedded in the electronic file that reports the number of times printed to the bank.

The financial document provided at block 210 contains one or more terms of the loan contract between the bank and the customer which are accepted when the customer executes the financial document. As discussed above, the customer may execute the financial document at the merchant for the purchase of the item. The execution of the financial document, wherein the financial document contains the terms of the loan as well as a loan identifying number, is considered to be an offer and acceptance of the loan contract. Upon execution, the financial document is an immediately negotiable instrument. Immediately negotiable, as used herein, denotes that the instrument may be presented by the merchant for payment without any further involvement by the customer, or further interaction between the customer and the bank. This further interaction may have included the customer contacting the bank for a further authorization of the instrument. However, the only action required by the customer, using this method, is their execution by signature of the financial document. The merchant may also provide identifying details of the item purchased on the financial document, which when presented to the bank, allows the bank to enter that identifying information about the item into the records for that loan. However, no interaction between the customer and the bank is required to enable the financial document to be used by the merchant for payment. The merchant, in this example, may be a franchised merchant that is a participant in a program such as that described here, but the methods and systems are not limited in any such manner. Any merchant could be presented with the instrument, which they can deposit without any further information, other than execution, from the customer.

In an embodiment, the financial document contains one or more pieces of information needed by the bank. This information may include, without limitation, any of the following: expiration date, authorization number field, date field, maximum amount, minimum amount, item details fields, legally binding contract language, and signature lines for the customer. The authorization number field, in one example, is filled prior to the financial document being provided to the customer. The item data fields may include, in one example, at least one of the following: vehicle make, vehicle model, vehicle series, vehicle year, vehicle mileage; and vehicle identification number (VIN). The legally binding contract language, in an example, includes a loan reference number and which when executed by the signing of the customer constitutes the acceptance of loan terms, including repayment, for the purchase of a secured item.

Figure 3:
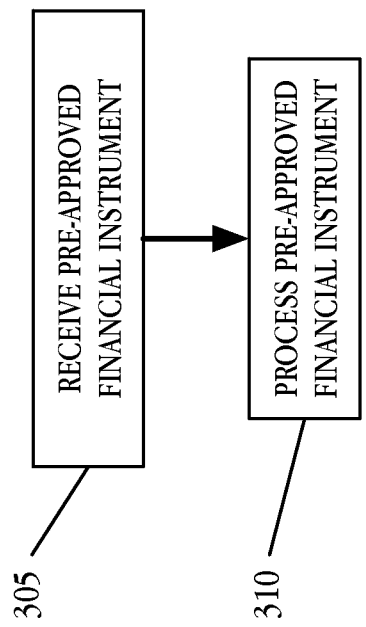
FIG. 3 shows a flowchart of a method for processing a pre-approved financial device, in accordance with an example embodiment.

FIG. 3 shows a flowchart of a method for processing a pre-approved financial device, in accordance with an example embodiment. The operations shown in FIG. 3 and described here may be carried out within the system shown above in FIG. 1.

At block 305, the bank receives a pre-approved financial instrument from a merchant. This may include receiving the pre-approved financial instrument through the federal reserve bank system, in one example. This may involve the actual physical document being delivered, or deposited, by the merchant to the merchant's bank, which sends the physical document to the bank through the federal reserve bank. It may also include the merchant's bank scanning into electronic form and sending the electronic form to the bank through the federal reserve system. In either example, the merchant's bank presents the pre-approved financial document (which is executed by the customer at the time of purchase as described above) for settlement. Further funds transfer are performed using any suitable means.

At block 310, the bank processes the pre-approved financial instrument and transfers funds to the merchant's bank. The pre-approved financial instrument is executed, in one example, by the lendee concurrent with the purchase of an item that is to be financed using the pre-approved financial instrument. Concurrent, as used herein, means the instrument is executed at the same time as the purchase. In the context of an automobile purchase, the instrument would be executed at the dealership when the lendee finally chooses the vehicle they wish to purchase. This may include, executing the instrument with the business manager of the dealership as if the lendee was writing a personal check for the purchase of the vehicle. The pre-approved financial instrument may also be presented by the lendee to a private seller, in other examples, and executed as if the pre-approved financial instrument was a personal check written by the lendee.

The pre-approved financial instrument, in one example, has a pre-printed authorization code. This authorization code is printed on the pre-approved financial instrument by the bank before the instrument is delivered to the customer. The pre-approved financial instrument contains, in an example, legally binding language which obligates the lendee to the repayment of a financed loan for the amount of the pre-approved financial instrument. The legally binding language may include language that is specific to a jurisdiction. This may be the jurisdiction in which the lendee resides, but may also include the jurisdiction in which the merchant conducts their business. Depending on the jurisdiction, differing language may be required to constitute a legally binding contract between the bank and the lendee. Further, the contract may be considered to be executed at either the location of the merchant or the residence of the lendee.

The processing of the pre-approved financial instrument may include one or more operations to be performed by the bank. The bank verifies the amount entered on the instrument by either the lendee or the merchant. During the processing, the bank, or an agent at the bank, enters some or all of the information contained on the instrument. This may include entering the data through a user interface into a data store of all loans carried by the bank. Information about the merchant, including the destination for funds transfer, is additionally verified. The lendee may have agreed, when they applied for the loan, to automatic payments to be deducted from a financial account. This may be a requirement for the provision of the pre-approved financial instrument, in one example. If the lendee has agreed, the bank initiates the automatic payment. Finally, a set of documents are delivered to the lendee through any suitable means, which can be stored by the lendee.

Figure 4:
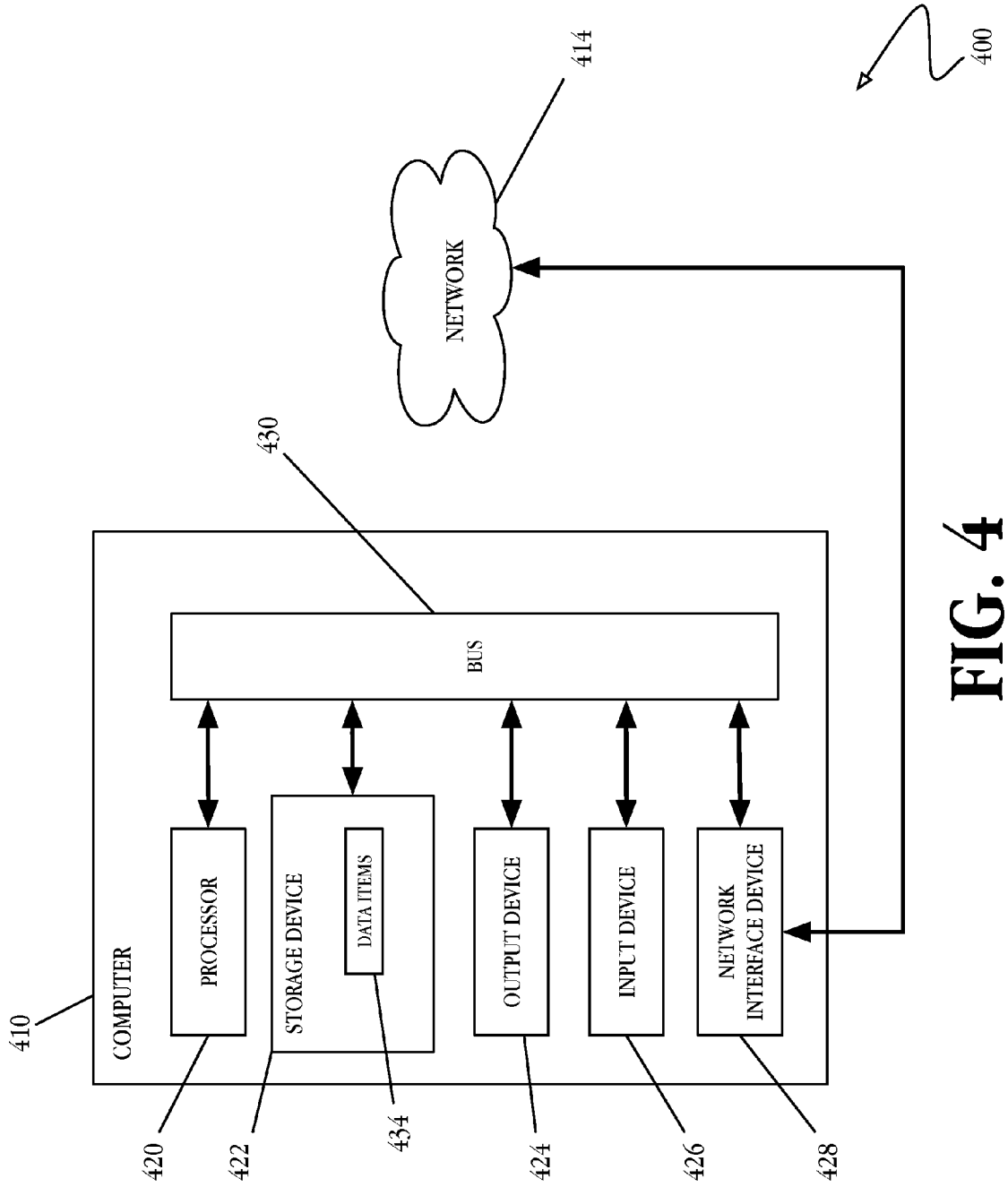
FIG. 4 shows a block diagram of a machine including instructions to perform any one or more of the methodologies described herein.

FIG. 4 shows a block diagram of a machine including instructions to perform any one or more of the methodologies described herein. A system 400 includes a computer 410 connected to a network 414. The computer 410 includes a processor 420, a storage device 422, an output device 424, an input device 424, and a network interface device 428, all connected via a bus 430. The processor 420 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 420 executes instructions and includes that portion of the computer 410 that controls the operation of the entire computer. Although not depicted in FIG. 4, the processor 420 typically includes a control unit that organizes data and program storage in memory and transfers data and other information between the various parts of the computer 410. The processor 420 receives input data from the input device 424 and the network 414 reads and stores code and data in the storage device 422 and presents data to the output device 424.

Although the computer 410 is shown to contain only a single processor 420 and a single bus 430, the disclosed embodiment applies equally to computers that may have multiple processors and to computers that may have multiple busses with some or all performing different functions in different ways.

The storage device 422 represents one or more mechanisms for storing data. For example, the storage device 422 may include read-only memory (ROM), random access memory (RAM), magnetic disk storage media, optical storage media, flash memory devices, and/or other machine-readable media. In other embodiments, any appropriate type of storage device may be used. Although only one storage device 422 is shown, multiple storage devices and multiple types of storage devices may be present. Further, although the computer 410 is drawn to contain the storage device 422, it may be distributed across other computers, for example on a server.

The storage device 422 includes a controller (not shown in FIG. 4) and data items 434. The controller includes instructions capable of being executed on the processor 420 to carry out the functions, as previously described above with reference to FIGS. 1-3. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 422 may also contain additional software and data (not shown), which is not necessary to understand the invention.

Although the controller and the data items 434 are shown to be within the storage device 422 in the computer 410, some or all of them may be distributed across other systems, for example on a server and accessed via the network 414.

The output device 424 is that part of the computer 410 that displays output to the user. The output device 424 may be a liquid crystal display (LCD) well-known in the art of computer hardware. But, in other embodiments the output device 424 may be replaced with a gas or plasma-based flat-panel display or a traditional cathode-ray tube (CRT) display. In still other embodiments, any appropriate display device may be used. Although only one output device 424 is shown, in other embodiments any number of output devices of different types, or of the same type, may be present. In an embodiment, the output device 424 displays a user interface.

The input device 426 may be a keyboard, mouse or other pointing device, trackball, touchpad, touch screen, keypad, microphone, voice recognition device, or any other appropriate mechanism for the user to input data to the computer 410 and manipulate the user interface previously discussed. Although only one input device 426 is shown, in another embodiment any number and type of input devices may be present.

The network interface device 428 provides connectivity from the computer 410 to the network 414 through any suitable communications protocol. The network interface device 428 sends and receives data items from the network 414.

The bus 430 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 410 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 410. For example, other peripheral devices such as audio adapters or chip programming devices, such as EPROM (Erasable Programmable Read-Only Memory) programming devices may be used in addition to, or in place of, the hardware already depicted. The network 414 may be any suitable network and may support any appropriate protocol suitable for communication to the computer 410. In an embodiment, the network 414 may support wireless communications. In another embodiment, the network 414 may support hard-wired communications, such as a telephone line or cable. In another embodiment, the network 414 may support the Ethernet IEEE (Institute of Electrical and Electronics Engineers) 802.3x specification. In another embodiment, the network 414 may be the Internet and may support IP (Internet Protocol). In another embodiment, the network 414 may be a local area network (LAN) or a wide area network (WAN). In another embodiment, the network 414 may be a hotspot service provider network. In another embodiment, the network 414 may be an intranet. In another embodiment, the network 414 may be a GPRS (General Packet Radio Service) network. In another embodiment, the network 414 may be any appropriate cellular data network or cell-based radio network technology. In another embodiment, the network 414 may be an IEEE 802.11 wireless network. In still another embodiment, the network 414 may be any suitable network or combination of networks. Although one network 414 is shown, in other embodiments any number of networks (of the same or different types) may be present.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:
1. A method comprising:
receiving, by a computer processor, from a customer, an application to finance a secured loan for a purchase of an item type;
approving the secured loan using information contained in the application;
generating by the computer processor, for the customer, a financial document including a plurality of legal terms printed on the financial document;
receiving the financial document from a merchant financial institution associated with a merchant by the computer processor, the merchant selling an item of the item type to the customer;
determining by the computer processor whether the financial document is an immediately negotiable instrument for purchase of the item in a single step that includes a contract between a customer lending institution and the customer for the purchase of the item based on the plurality of legal terms, the immediately negotiable instrument requiring no further interaction between the customer and the customer lending institution to fund the purchase of the item after the generating of the financial document; and
providing funding from the customer lending institution to the merchant financial institution by the computer processor in response to a determination that the financial document is the immediately negotiable instrument.

2. The method of claim 1, wherein the financial document includes an expiration date, an authorization number field, a date field, a maximum amount, a minimum amount, an item details field, a signature line for the customer, or combinations thereof.

3. The method of claim 1, further comprising:
providing the financial document to the customer.

4. The method of claim 1, further comprising:
receiving details regarding the item,
wherein the providing of the funding to the merchant financial institution is in response to the determination that the financial document is the immediately negotiable instrument and the receiving of the details regarding the item.

5. The method of claim 1, further comprising:
determining whether funding for the purchase of the item is greater than the value of the item; and
issuing a separate, unsecured loan to the customer for the difference between the funding for the purchase of the item and the value of the item based on a determination that the funding for the purchase of the item is greater than the value of the item.

6. The method of claim 1, further comprising:
providing the financial document to the customer based on the generating,
wherein the receiving of the financial document from the merchant financial institution is performed after the providing of the financial document to the customer.

7. A machine-readable medium comprising instructions, which when executed by a computer processor, cause the computer processor to perform the following operations:
receive, from a customer, an application to finance a secured loan for a purchase of an item type;
approve the secured loan using information contained in the application;
generate, for the customer, a financial document including a plurality of legal terms printed on the financial document
receive the financial document from a merchant financial institution associated with a merchant, the merchant selling an item of the item type to the customer;
determine whether the financial document is an immediately negotiable instrument for purchase of the item in a single step that includes a contract between a customer lending institution and the customer for the purchase of the item based on the plurality of legal terms, the immediately negotiable instrument requiring no further interaction between the customer and the customer lending institution to fund the purchase of the item after the generating of the financial document; and provide funding from the customer lending institution to the merchant financial institution in response to a determination that the financial document is the immediately negotiable instrument.

8. The machine-readable medium of claim 7, wherein the financial document includes an expiration date, an authorization number field, a date field, a maximum amount, a minimum amount, an item details field, a signature line for the customer, or combinations thereof.

9. The machine-readable medium of claim 7, further comprising instructions that cause the computer processor to:
provide the financial document to the customer.

10. The machine-readable medium of claim 7, further comprising instructions that cause the computer processor to:
receive details regarding the item,
wherein providing the funding to the merchant financial institution is in response to the determination that the financial document is the immediately negotiable instrument and the receipt of the details regarding the item.

11. The machine-readable medium of claim 7, further comprising instructions that cause the computer processor to:
determining whether funding for the purchase of the item is greater than the value of the item; and
issuing a separate, unsecured loan to the customer for the difference between the funding for the purchase of the item and the value of the item based on a determination that the funding for the purchase of the item is greater than the value of the item.

12. The machine-readable medium of claim 7, further comprising instructions that cause the computer processor to:
provide the financial document to the customer based on generation,
wherein receipt of the financial document from the merchant financial institution is performed after providing the financial document to the customer.

13. A system comprising:
a computer processor and a memory coupled to the computer processor;
a subsystem deployed in the memory and executed by the computer processor to receive through a network interface device, from a customer, an application to finance a secured loan for a purchase of an item type;
a subsystem deployed in the memory and executed by the computer processor to approve the secured loan using information contained in the application; and
a subsystem deployed in the memory and executed by the computer processor to generate, for the customer, a financial document including a plurality of legal terms printed on the financial document;
a subsystem deployed in the memory and executed by the computer processor to receive the financial document from a merchant financial institution associated with a merchant, the merchant selling an item of the item type to the customer;
a subsystem deployed in the memory and executed by the computer processor to determine whether the financial document is an immediately negotiable instrument for purchase of the item in a single step that includes a contract between a customer lending institution and the customer for the purchase of the item based on the plurality of legal terms, the immediately negotiable instrument requiring no further interaction between the customer and the customer lending institution to fund the purchase of the item after the generating of the financial document; and
a subsystem deployed in the memory and executed by the computer processor to provide funding from the customer lending institution to the merchant financial institution in response to a determination that the financial document is the immediately negotiable instrument.

14. The system of claim 13, wherein the financial document includes an expiration date, an authorization number field, a date field, a maximum amount, a minimum amount, an item details field, a signature line for the customer, or combinations thereof.

15. The system of claim 13, further comprising:
at least one subsystem deployed in memory and executed by the processor to provide the financial document to the customer.

16. The system of claim 13, further comprising:
at least one subsystem deployed in memory and executed by the computer processor to receive details regarding the item,
wherein providing the funding to the merchant financial institution is in response to the determination that the financial document is the immediately negotiable instrument and the receipt of the details regarding the item.

17. The system of claim 13, further comprising:
at least one subsystem deployed in memory and executed by the computer processor to determine whether funding for the purchase of the item is greater than the value of the item; and
at least one subsystem deployed in memory and executed by the computer processor to issue a separate, unsecured loan to the customer for the difference between the funding for the purchase of the item and the value of the item based on a determination that the funding for the purchase of the item is greater than the value of the item.

18. The system of claim 13, further comprising:
at least one subsystem deployed in the memory and executed by the computer processor to provide the financial document to the customer based on generation,
wherein receipt of the financial document from the merchant financial institution is performed after providing the financial document to the customer.

* * * * *